United States Patent
Taniguchi et al.

(10) Patent No.: US 9,895,765 B2
(45) Date of Patent: Feb. 20, 2018

(54) RESISTANCE SPOT WELDING METHOD

(71) Applicant: JFE STEEL CORPORATION, Tokyo (JP)

(72) Inventors: Koichi Taniguchi, Tokyo (JP); Yasuaki Okita, Tokyo (JP); Rinsei Ikeda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 42 days.

(21) Appl. No.: 15/033,168

(22) PCT Filed: Dec. 4, 2014

(86) PCT No.: PCT/JP2014/006074
§ 371 (c)(1),
(2) Date: Apr. 29, 2016

(87) PCT Pub. No.: WO2015/083381
PCT Pub. Date: Jun. 11, 2015

(65) Prior Publication Data
US 2016/0271719 A1     Sep. 22, 2016

(30) Foreign Application Priority Data
Dec. 5, 2013  (JP) .................................. 2013-252360

(51) Int. Cl.
*B23K 10/00* (2006.01)
*B23K 11/11* (2006.01)
(Continued)

(52) U.S. Cl.
CPC ......... *B23K 11/115* (2013.01); *B23K 11/0026* (2013.01); *B23K 11/166* (2013.01);
(Continued)

(58) Field of Classification Search
CPC . B23K 11/115; B23K 11/0026; B23K 11/166; B23K 2201/006; B23K 2201/34; B23K 2203/04
(Continued)

(56) References Cited

U.S. PATENT DOCUMENTS 5,483,035 A * 1/1996 Kawai .................. B23K 11/253
219/110
5,764,859 A * 6/1998 Kim ..................... B23K 11/252
219/109

(Continued)

FOREIGN PATENT DOCUMENTS

JP     H107-88659 A    4/1995
JP     3849539 B2      11/2006
(Continued)

OTHER PUBLICATIONS

Mar. 10, 2015 International Search Report issued in International Patent Application No. PCT/2014/006074.
(Continued)

*Primary Examiner* — Mark Paschall
(74) *Attorney, Agent, or Firm* — Oliff PLC

(57) ABSTRACT

Resistance spot welding is performed on a combination of overlapping steel sheets including at least one steel sheet that has, on a surface thereof, a coated layer with zinc as a main component, by (1) starting electric current passage in a state satisfying $0.9 \times t \leq L \leq 1.1 \times t$; and (2) dividing electric current into main current and initial current that precedes the main current and is two-step current, setting a current value $I_1$ during current in a first step of the initial current to satisfy $I_m \times 1.1 \leq I_1 \leq 15.0$ kA with respect to a current value $I_m$ during the main current, and setting a current value $I_2$ in the subsequent second step to no current or low current satisfying $0 \leq I_2 \leq I_m \times 0.7$.

6 Claims, 3 Drawing Sheets

(51) Int. Cl.
  B23K 11/16    (2006.01)
  B23K 11/00    (2006.01)
  B23K 101/00   (2006.01)
  B23K 101/18   (2006.01)
  B23K 101/34   (2006.01)
  B23K 103/04   (2006.01)

(52) U.S. Cl.
  CPC .... *B23K 2201/006* (2013.01); *B23K 2201/18* (2013.01); *B23K 2201/34* (2013.01); *B23K 2203/04* (2013.01)

(58) Field of Classification Search
  USPC .................................. 219/91.2, 86.1, 86.22
  See application file for complete search history.

(56) References Cited

U.S. PATENT DOCUMENTS

| | | | | |
|---|---|---|---|---|
| 2003/0132201 | A1* | 7/2003 | Kaeseler | B23K 11/253 219/86.41 |
| 2012/0266658 | A1* | 10/2012 | Akiyama | G01N 27/125 73/31.05 |
| 2014/0214129 | A1* | 7/2014 | Waataja | A61N 1/36007 607/59 |

FOREIGN PATENT DOCUMENTS

| | | |
|---|---|---|
| JP | 3922263 B2 | 5/2007 |
| JP | 4728926 B2 | 7/2011 |
| JP | 2011-167742 A | 9/2011 |
| JP | 2013-121616 A | 6/2013 |

OTHER PUBLICATIONS

Tawada, Gajendra. " Robust Schedules for Spot Welding Zinc-Coated Advanced High Strength Automotive Steels". http://www.autostell.org/~/media/Files/Autosteel/Great Designs in Steel/ GDIS 2004/19 - robust Spot Welding Schedules.pdf, pp. 3,6,19,2, Feb. 17, 2004.

Tawade, Gajendra C. " Robust Schedules for Spot Welding Zinc-Coated Advanced High Strength Automotive Steels". http://digital.library.ryerson.ca/islandora/obejct/RULA:2089/datastream/OBJ/download/Robust_Schedules_for_Spot_Welding_Zinc-Coated_Advanced_High-Strength_Automotive Steels.pdf, pp. 68; figure 4.16,4,5,32,67-69, Dec. 31, 2004.

Oct. 31, 2016 Extended Search Report issued in European Patent Application No. 14868526.6.

* cited by examiner

FIG. 1
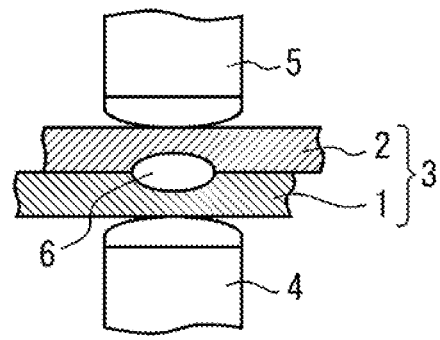
FIG. 2
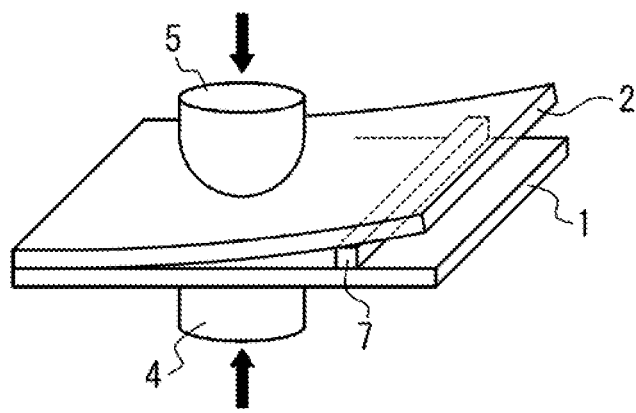
FIG. 3
(a)
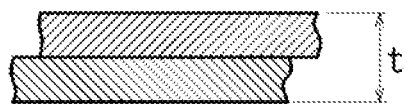
(b)
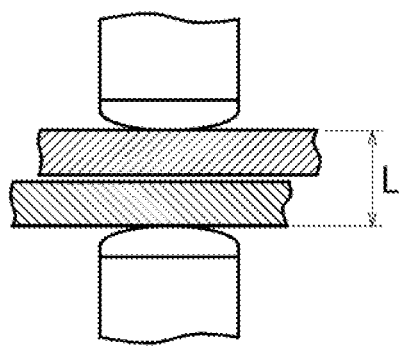

RESISTANCE SPOT WELDING METHOD

TECHNICAL FIELD

This disclosure relates to a method of resistance spot welding, which is a type of lap resistance welding. In particular, this disclosure aims to form a fused portion (nugget) of an appropriate size, without the occurrence of splashing or the like, even when a galvanized steel sheet having a galvanized surface or a high strength steel sheet with a tensile strength of 780 MPa or more is included in the sheets to be welded, or when an unintended gap (sheet gap) exists between the steel sheets.

BACKGROUND

In recent years, to improve the reliability of automotive bodies while also lowering the automotive body weight in order to reduce air pollutants, the strength of steel sheets has been enhanced. By adopting such high strength steel sheets, an equivalent automotive body rigidity can be obtained while reducing the thickness and weight as compared to conventional steel. Several problems, however, have been noted. One problem is that the quality of the weld in an automotive body assembly decreases as the strength of the steel sheet is enhanced.

As illustrated in FIG. 1, in resistance spot welding, a sheet combination 3 of two or more overlaid steel sheets (here, a pair of steel sheets: a lower steel sheet 1 and an upper steel sheet 2) is squeezed between a vertical pair of electrodes (a lower electrode 4 and an upper electrode 5), and by applying electrode force and current, the contact portion is welded to form a nugget 6 of a required size, thus yielding a weld joint.

The quality of a joint obtained in this way is evaluated based on factors such as the magnitude of the nugget diameter and the magnitude of the shear tensile strength (the strength when performing a tensile test in the shearing direction of the joint), the cross tensile strength (the strength when performing a tensile test in the peeling direction of the joint), or the fatigue strength.

In terms of the welding method, ways to guarantee weld strength when using high strength steel sheets include increasing the number of welding spots and expanding the nugget diameter. Increasing the number of welding spots, however, increases the effect of shunt current and also leads to longer operation time, thereby degrading productivity. In order to expand the nugget diameter, larger electrodes need to be used, and the electrode force needs to be increased in order to prevent splattering (splashing) of the weld metal. This is disadvantageous not only in that device-related restraints are significant, but also in that the base material properties are lost due to an expanded heat-affected zone.

In particular when a steel sheet is used in an automobile, the surface of the steel sheet is galvanized using zinc as the main component in order to prevent rust. It is known that splashing occurs even more easily when such a galvanized layer is included, adversely affecting nugget formation.

As a conventional technique, JP 4728926 B2 (PTL 1) discloses a method for forming a nugget in a combination of three overlapping steel 5 sheets. According to this method, after performing the first step of welding, the second and subsequent steps are performed in a cooling/current pulsation state, which supposedly allows formation of a sufficient nugget diameter even in a combination of three overlapped sheets, such as a thin sheet/thick sheet/thick sheet.

JP 2011-167742 A (PTL 2) asserts that when welding steel sheets that include an aluminum alloy coating containing 50% or more to 80% or less of Fe by ratio of atomic number, a stable nugget can be formed by prescribing the upslope time and the time to maintain constant current based on sheet thickness.

Furthermore, JP 3849539 B2 (PTL 3) asserts that a nugget of a certain size can be guaranteed by limiting the time ratio between preliminary current passage and nugget formation in a zinc or zinc alloy coated steel sheet.

JP 3922263 B2 (PTL 4) asserts that a nugget of a certain size can be guaranteed in a zinc or zinc alloy coated steel sheet by first performing preliminary current passage and then repeating cooling and current passage at a higher current value than the current value of the preliminary current passage.

CITATION LIST

Patent Literature

PTL 1: JP 4728926 B2
PTL 2: JP 2011-167742 A
PTL 3: JP 3849539 B2
PTL 4: JP 3922263 B2

SUMMARY

Technical Problem

On the actual floor where an automobile assembly is welded, however, the position of materials is not necessarily stable, and the state of electrode force on the steel sheets may not be constant. With respect to this point, the methods disclosed in PTL 1 to PTL 4 assume that the sheet combination is in a state of sufficient electrode force and contact due to the electrodes. Therefore, when an unintended gap (sheet gap) exists between the steel sheets, splashing occurs, making it difficult to guarantee a satisfactory nugget diameter.

It would therefore be helpful to provide a method of resistance spot welding that can stably form a nugget of sufficient diameter, without the occurrence of splashing, even when a portion of the sheet combination includes a galvanized steel sheet or a high tensile strength steel sheet, or when various unintended gaps of different sizes, i.e. different sheet gaps, exist between the steel sheets.

Solution to Problem

We therefore repeatedly examined the effect of a sheet gap on resistance spot welding of a sheet combination including a high tensile strength galvanized steel sheet.

That is, we simulated a sheet gap, as illustrated in FIG. 2, by wedging an insulating body 7 in at one side between the steel sheets 1 and 2 and then performed a welding test and corresponding numerical analysis at various current values.

The results showed that when applying a low current in a state with a large sheet gap, insufficient electrode force, and insufficient contact, a considerable amount of time is required until the steel sheets heat up and soften to reach a sufficient state of electrode force. On the other hand, when applying a high current, splashing does not occur if the welding time is short, and rapid heat generation and softening of the steel sheets were observed directly below the electrodes and at the outer edge of the contact surface between the steel sheets. The reason is thought to be as follows. Particularly at the start of electric current passage, the steel sheets are at room temperature or a sufficiently low temperature even when affected by another welded point. Hence, the specific resistance is low, and when applying a high current, heat generation due to the current density becomes pronounced.

Therefore, we then used the above-described phenomena to examine whether by applying a predetermined current before the main current to form the nugget we could ensure contact between the steel sheets without the occurrence of splashing. Since applying a high current for a long time naturally causes splashing, at this time we examined the effect of two-step current that lowers the current partway through the welding.

As the test steel sheets, we used high tensile strength hot-dip galvanized steel sheets with a tensile strength of 780 MPa to 1180 MPa and a sheet thickness of 1.0 mm to 1.6 mm. In order to adjust the distance between steel sheets or the distance between electrodes, we wedged an insulating body 7 with a predetermined thickness, such as the one illustrated in FIG. 2, in between the steel sheets 1 and 2 and performed the experiment.

The results showed that by passing, for a short time, a high current relative to the current necessary to form a nugget, the distance between the electrodes can be greatly reduced. Moreover, after this high current, the effect of reducing the distance is maintained even with no current flow or low current. The reason is thought to be that after heat generation occurs due to current density directly below the electrodes as a result of the initial high current, the heat is transferred in the steel sheets.

We also discovered that in order to use the heat generated by the current density upon the above-mentioned high current for a short time, the total thickness of the steel sheets in the sheet combination and the distance between electrodes are also important. Before the high current for a short time, the relationship between these factors needs to be adjusted to an appropriate range.

Our method is based on these findings.

We thus provide:

1. A method of resistance spot welding to join a sheet combination by squeezing the sheet combination between a pair of electrodes and passing current while applying electrode force, the sheet combination being a plurality of overlapping steel sheets including at least one galvanized steel sheet or high tensile strength steel sheet, the galvanized steel sheet having, on a surface thereof, a coated layer with zinc as a main component, the method comprising:

(1) starting electric current passage in a state satisfying $$0.9 \times t \leq L \leq 1.1 \times t$$

where t is a total thickness of the overlapping steel sheets and L is a distance between tips of the pair of electrodes; and (2) dividing electric current into main current and initial current that precedes the main current and is two-step current, setting a current value $I_1$ in a first step of the initial current to satisfy $$I_m \times 1.1 \leq I_1 \leq 15.0 \text{ kA}$$

with respect to a current value $I_m$ during the main current, and setting a current value $I_2$ in a second step to no current or low current satisfying $$0 \leq I_2 \leq I_m \times 0.7.$$

2. The method of 1., wherein $$10 \text{ ms} \leq T_1 \leq 100 \text{ ms}$$

$$10 \text{ ms} \leq T_2 \leq 100 \text{ ms}$$

where $T_1$ is a welding time in the first step of the initial current, and $T_2$ is a welding time or a non-welding time during current in the second step following the first step.

3. The method of 1. or 2., wherein the initial current is 2k-step current (where k is an integer greater than or equal to 2).

4. The method of 3., wherein when performing the initial current that is 2k-step current (where k is an integer greater than or equal to 2), a current value $I_{(2n+1)}$ in a $(2n+1)^{th}$ step (where n is an integer from 1 to k−1) of the initial current satisfies $$I_m \leq I_{(2n+1)} \leq I_{(2n-1)}$$

with respect to a current value $I_{(2n-1)}$ in a $(2n-1)^{th}$ step and the current value $I_m$ during the main current.

5. The method of any one of to 4., wherein among the plurality of steel sheets, at least one sheet is a high tensile strength galvanized steel sheet with a tensile strength of 780 MPa or more.

Advantageous Effect

According to this disclosure, when performing a method of resistance spot welding on a sheet combination that is a plurality of overlapping steel sheets including at least one galvanized steel sheet or high tensile strength steel sheet, a nugget of sufficient diameter can be formed without the occurrence of splashing even when a sheet gap had occurred between the stacked steel sheets. This is highly useful in industrial terms.

BRIEF DESCRIPTION OF THE DRAWINGS

In the accompanying drawings:

FIG. 1 illustrates the configuration of resistance spot welding;

FIG. 2 illustrates a state in which an insulating body is wedged in at one side between steel sheets;

FIGS. 3(a) and 3(b) illustrate a total thickness t of steel sheets and a distance L between tips of upper and lower electrodes;

DETAILED DESCRIPTION

Figure 4:
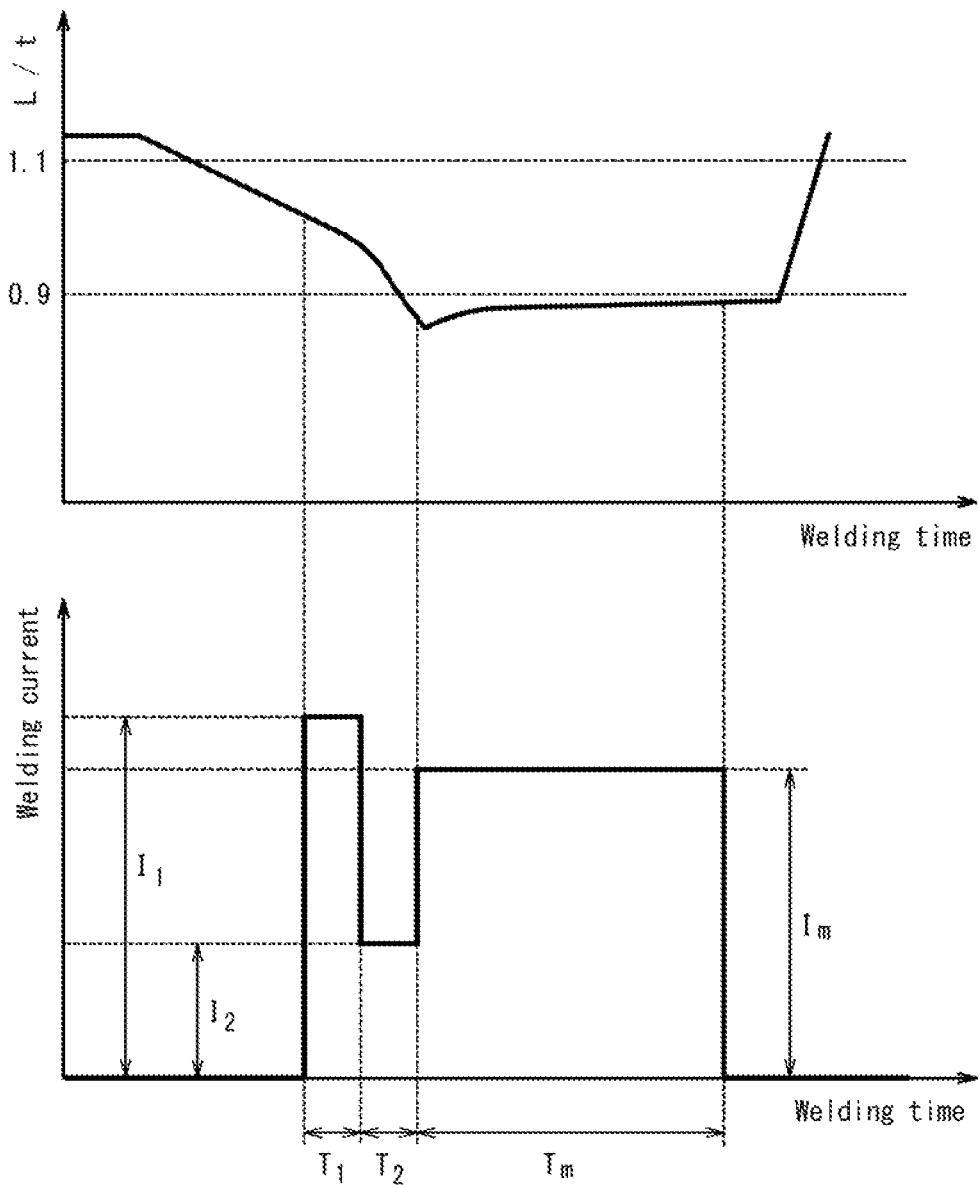
FIG. 4 illustrates the current waveform during an initial current, which is two-step electric current, and a main current.

The following describes one of the disclosed embodiments with reference to the drawings.

The method of resistance spot welding of this disclosure is, as illustrated in FIG. 1, for obtaining a weld joint by squeezing a sheet combination 3 that is a plurality of overlapping steel sheets including a galvanized steel sheet or a high tensile strength steel sheet between a pair of upper and lower electrodes 4 and 5 and passing current while applying electrode force to form a nugget 6 of a necessary size. Here, between the lower steel sheet 1 and the upper steel sheet 2, the steel sheet 1 is a high tensile strength galvanized steel sheet.

This disclosure targets a sheet combination which at least one sheet is a galvanized steel sheet or a high tensile strength steel sheet. The reason is that as compared to a regular steel sheet, splashing due to a sheet gap occurs more easily with a galvanized steel sheet or a high tensile strength steel sheet.

This disclosure is more effective when the sheet combination includes two or more galvanized steel sheets or high tensile strength steel sheets.

A suitable welding device used to perform such spot welding is equipped with a pair of upper and lower electrodes and can apply electrode force and pass current while squeezing the portion to be welded between the pair of electrodes. The welding device should also include an electrode force control unit and a welding current control unit that can freely control the electrode force and the welding current during welding. Any force mechanism (such as an air cylinder or servomotor), current control mechanism (such as AC or DC), form (such as a stationary welder or robot uun), and the like may be used.

In this disclosure, it is important that electric current be started in a state satisfying $$0.9 \times t \leq L \leq 1.1 \times t$$

where t is the total thickness of the overlapping steel sheets as illustrated in FIG. 3(a), and L is the distance between tips of the upper and lower electrodes as illustrated in FIG. 3(b).

If L/t is less than 0.9, the electrode contact portion is in an expanded state, and the effect of heat generation due to electric current reduces. Conversely, if L/t exceeds 1.1, the problem of not being able to ensure a contact portion within the sheet combination arises, even when the steel sheets are softened due to heat generation. A preferred range is $0.9 \times t \leq L \leq 1.0 \times t$.

For the above-described setting, it is assumed that a sheet gap exists between the steel sheets. Such a sheet, gap could, for example, be caused by a sheet gap at a flange due to mismatched shapes in the automotive body. When L/t>1.0, however, it is assumed that there is some sort of current path, such as a contact portion between the steel sheets or a previously welded point near the welding point, or due to the entire materials being conductive. When no current path exists, current passage is impossible, making welding difficult even upon applying this disclosure.

On the other hand, L/t is not restricted after the start of current passage. Normally, however, L/t goes through a process of gradually lowering as the steel sheets soften due to current passage and then increasing somewhat due to expansion of a fused portion (nugget) formed during the latter half of current passage.

Typically, the electrode force applied at the start of current passage is approximately 3.5 kN to 7.0 kN.

The current passage in this disclosure includes a main current for forming a nugget with an appropriate diameter and an initial current, preceding the main current, for ensuring the contact area between the steel sheets.

Furthermore, in this disclosure, the initial current is two-step current. During current in the first step, a high current is passed for a short time to generate heat due to the current density directly below the electrodes and soften the steel sheets, thereby reducing the distance between the electrodes. For the current in the subsequent second step, either no current or low current is performed for a short time to propagate the heat generated by the above-mentioned current density into the steel sheets, further soften the steel sheets, and even further reduce the distance between the electrodes.

Current in the first step of the initial current is high current such that the current value $I_1$ satisfies $$I_m \times 1.1 \leq I_1 \leq 15.0 \text{ kA}$$

with respect to the current value $I_n$ of the main current, and the current in the subsequent second step is no current. or low current such that the current value $I_2$ thereof satisfies $$0 \leq I_2 \leq I_m \times 0.7.$$

FIG. 4 illustrates the current waveform in this embodiment.

As illustrated in FIG. 4, in this disclosure, before the main current constituted by the welding current value $I_m$ and the welding time $T_m$, initial current constituted by current in the first step at the current value $I_1$ and the welding time $T_1$ and current in the second step at the current value $I_2$ and the welding time $T_2$ is performed.

When the main current is controlled to be two step or three step, the welding current $I_m$ is defined as the average of the welding current in the main current.

If the current value $I_1$ in the first step of the initial current does not satisfy $I_m \times 1.1$, then sufficient heat generation due to the current density is not obtained. Conversely, if $I_1$ exceeds 15.0 kA, the occurrence of splashing cannot be avoided at least in a high tensile strength steel sheet having a galvanized layer. In order to suppress excessive heat input, $I_1$ is preferably in the range of $I_m \times 1.1 \leq I_1 \leq 12.0$ kA. If the current value $I_2$ in the second step of the initial current exceeds $I_m \times 0.7$, then suitable heat transfer that does not cause an excessive increase in temperature cannot be expected. Accordingly, the current value $I_2$ of the current in the second step is either no current, i.e. $I_2=0$, or low current such that the relationship $I_2 \leq I_m \times 0.7$ is satisfied. $I_2$ is more preferably in the range of $0 \leq I_2 \leq I_m \times 0.5$.

The ranges $$10 \text{ ms} \leq T_1 \leq 100 \text{ ms},$$

$$10 \text{ ms} \leq T_2 \leq 100 \text{ ms},$$

where $T_1$ is the welding time in the first step of the initial current, and $T_2$ is the welding time or non-welding time in the second step, are preferred.

If $T_1$ is less than 10 ms, then sufficient heat generation due to current density is not obtained, whereas if $T_1$ exceeds 100 ms, splashing is highly likely for a galvanized steel sheet. If $T_2$ is less than 10 ms, then sufficient heat generation is not obtained, making further softening difficult, whereas if $T_2$ exceeds 100 ms, the problem of splashing occurs due to excessive heat input.

$T_1$ and $T_2$ are more preferably in the following ranges:

$$10 \text{ ms} \leq T_1 \leq 60 \text{ ms},$$

$$10 \text{ ms} \leq T_2 \leq 60 \text{ ms},$$

Figure 5:
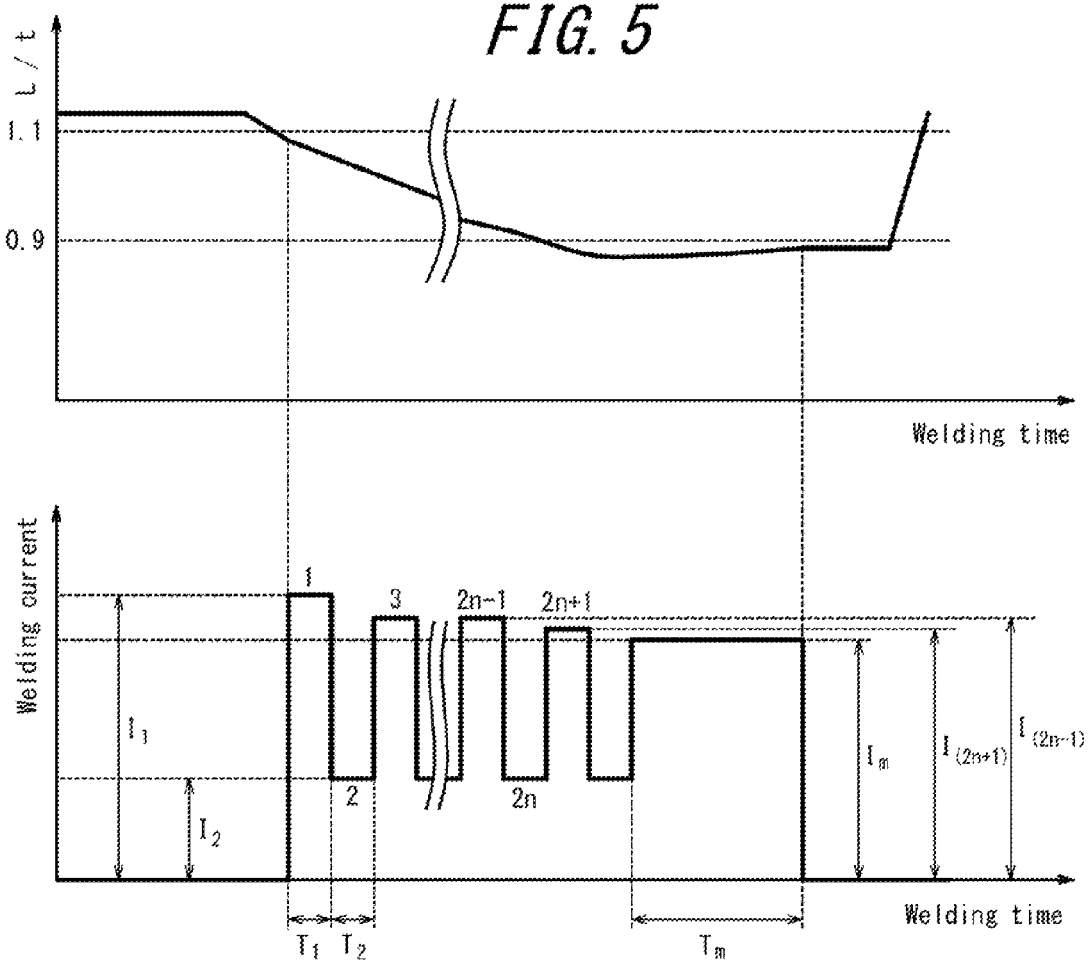
FIG. 5 illustrates the current waveform when repeating the initial current, which is two-step current, according to this disclosure.

Furthermore, in this disclosure, the above-described initial current may be 2k-step current (where k is an integer greater than or equal to 2). Such 2k-step initial current allows the steel sheets to be softened and the nugget to be expanded while controlling the occurrence of splashing, even if the initial sheet gap is large. FIG. 5 illustrates the current waveform in this embodiment.

When performing such 2k-step initial current, a current value $I_{(2n+1)}$ in the $(2n+1)^{th}$ step (where n is an integer from 1 to k−1) of the initial current preferably satisfies $$I_m \leq I_{(2n+1)} \leq I_{(2n+1)}$$

with respect to a current value $I_{(2n-1)}$ in the $(2n-1)^{th}$ step and the current value $I_m$ during the main current.

The reason is that if the current value $I_{(2n+1)}$ becomes larger than the current value $I_{(2n-1)}$, splashing might occur due to sudden beat input.

If the current value $I_{(2n+2)}$ in the $(2n+2)^{th}$ step (where n is an integer from 1 to k−1) of the initial current exceeds $I_m \times 0.7$, then suitable heat transfer that does not cause an excessive increase in temperature cannot be expected. Accordingly, the current value $I_{(2n+2)}$ of the current in the $(2n+2)^{th}$ step is preferably either no current, i.e. $I_{(2n+2)}=0$, or low current such that the relationship $I_{(2n+2)} \leq I_m \times 0.7$ is satisfied. $I_{(2n+2)}$ is more preferably in the range of $0 \leq I_{(2n+2)} \leq I_m \times 0.5$.

The ranges $$10 \text{ ms} \leq T_{(2n+1)} \leq 100 \text{ ms},$$

$$10 \text{ ms} \leq T_{(2n+2)} \leq 100 \text{ ms},$$

where $T_{(2n+1)}$ is the welding time in the $(2n+1)^{th}$ step (where n is an integer from 1 to k−1) of the initial current, and $T_{(2n+2)}$ is the welding time or non-welding time in the $(2n+2)^{th}$ step, are preferred.

If $T_{(2n+1)}$ is less than 10 ms, then sufficient heat generation due to current density is not obtained, whereas if $T_{(2n+2)}$ exceeds 100 ms, splashing is highly likely for a galvanized steel sheet. If $T_{(2n+2)}$ is less than 10 ms, then sufficient heat generation is not obtained, making further softening difficult, whereas if $T_{(2n+2)}$ exceeds 100 ms, the problem of splashing occurs due to excessive heat input.

$T_{(2n+1)}$ are more preferably in the following ranges:

$$10 \text{ ms} \leq T_{(2n+1)} \leq 60 \text{ ms},$$

$$10 \text{ ms} \leq T_{(2n+2)} \leq 60 \text{ ms},$$

When performing the 2k-step (where k is an integer greater than or equal to 2) initial current as described above, the nugget formation proceeds gradually. The welding time of the main current can thus be shortened.

In this disclosure, a coated layer with zinc as the main component refers to any widely-known galvanized layer, starting with a hot-dip galvanized layer and an electrogalvanized layer, and including a Zn—Al coated layer, a Zn—Ni layer, and the like.

In this disclosure, a high tensile strength steel sheet refers to a steel sheet with a tensile strength of 780 MPa or more.

EXAMPLES

Example 1

As an example of this disclosure, using a resistance welding machine, attached to a C gun, that was of a servomotor pressine type and had a DC power source, the sheet combination 3 in which two steel sheets were overlapped (lower steel sheet 1 and upper steel sheet 2), as illustrated in the above-described FIG. 1, was resistance spot welded to produce a resistance spot weld joint.

The current at this time had the current waveform illustrated in FIG. 4 (the initial current being performed in two steps) and was performed under the conditions listed in Table 1. The electrode force was constant at 4.5 kN, and the welding time $T_m$ of the main current was constant at 14 cycles (280 ms). In the experiment, the insulating body 7 was inserted between the steel sheets to adjust the distance between the electrodes to a predetermined distance.

DR-type electrodes made of alumina-dispersed copper and each having a curvature radius of R40 at the tip and a tip diameter of 6 mm were used as the electrodes 4 and 5. Furthermore, as the test pieces, 1.0 mm to 1.2 mm galvanized steel sheets that were 780 MPa grade to 1470 MPa grade were used.

Table 1 illustrates the results of verifying whether splashing occurred and verifying the nugget diameter upon performing welding. The nugget diameter was evaluated by the etching structure of a sliced section. A nugget diameter of $5\sqrt{t}$ or greater was evaluated as excellent, $4\sqrt{t}$ or greater to less than $5\sqrt{t}$ as good, and less than $4\sqrt{t}$ as poor, where t is the sheet thickness. Since sufficient joint strength is obtained if the nugget diameter is $4\sqrt{t}$ or greater, a diameter of $4\sqrt{t}$ or greater was deemed to be an appropriate diameter.

TABLE 1

| No. | Steel sheet 1 Tensile strength (MPa) | Steel sheet 1 Sheet thickness (mm) | Steel sheet 2 Tensile strength (MPa) | Steel sheet 2 Sheet thickness (mm) | L (mm) | t (mm) | L/t | $I_1$ (kA) | $T_1$ (ms) | $I_2$ (kA) | $T_2$ (ms) | $I_m$ (kA) | $I_1/I_m$ | $I_2/I_m$ | Occurrence of splashing | Nugget diameter | Notes |
|---|---|---|---|---|---|---|---|---|---|---|---|---|---|---|---|---|---|
| 1 | 793 | 1 | 793 | 1 | 2.05 | 2 | 1.03 | 9.6 | 60 | 3.6 | 20 | 6 | 1.60 | 0.60 | no | good | Example |
| 2 | 793 | 1 | 793 | 1 | 2.05 | 2 | 1.03 | 9.6 | 60 | 3 | 40 | 6 | 1.60 | 0.50 | no | good | Example |
| 3 | 793 | 1 | 793 | 1 | 2.05 | 2 | 1.03 | 9.6 | 60 | 0 | 20 | 6 | 1.60 | 0.00 | no | good | Example |
| 4 | 793 | 1 | 793 | 1 | 2.05 | 2 | 1.03 | 5.4 | 60 | 4.8 | 20 | 6 | 0.90 | 0.80 | yes | poor | Comparative Example |
| 5 | 793 | 1 | 793 | 1 | 3.8 | 2 | 1.90 | 9.6 | 60 | 3.6 | 20 | 6 | 1.60 | 0.60 | yes | poor | Comparative Example |
| 6 | 1210 | 1.2 | 1210 | 1.2 | 2.4 | 2.4 | 1.00 | 9.6 | 60 | 3.6 | 20 | 6 | 1.60 | 0.60 | no | good | Example |
| 7 | 1210 | 1.2 | 1210 | 1.2 | 2.4 | 2.4 | 1.00 | 9.6 | 60 | 3 | 40 | 6 | 1.60 | 0.50 | no | good | Example |
| 8 | 1210 | 1.2 | 1210 | 1.2 | 2.4 | 2.4 | 1.00 | 9.6 | 60 | 0 | 20 | 6 | 1.60 | 0.00 | no | good | Example |
| 9 | 1210 | 1.2 | 1210 | 1.2 | 2.4 | 2.4 | 1.00 | 5.4 | 60 | 4.8 | 20 | 6 | 0.90 | 0.80 | yes | poor | Comparative Example |
| 10 | 1210 | 1.2 | 1210 | 1.2 | 4.4 | 2.4 | 1.83 | 9.6 | 60 | 3 | 20 | 6 | 1.60 | 0.50 | yes | poor | Comparative Example |
| 11 | 1530 | 1.4 | 1530 | 1.4 | 2.76 | 2.8 | 0.99 | 9.6 | 60 | 3 | 20 | 6 | 1.60 | 0.50 | no | good | Example |
| 12 | 1530 | 1.4 | 1530 | 1.4 | 2.76 | 2.8 | 0.99 | 9.6 | 60 | 3.6 | 40 | 6 | 1.60 | 0.60 | no | good | Example |
| 13 | 1530 | 1.4 | 1530 | 1.4 | 2.76 | 2.8 | 0.99 | 9.6 | 60 | 0 | 20 | 6 | 1.60 | 0.00 | no | good | Example |
| 14 | 1530 | 1.4 | 1530 | 1.4 | 2.76 | 2.8 | 0.99 | 5.4 | 60 | 4.8 | 20 | 6 | 0.90 | 0.80 | yes | poor | Comparative Example |
| 15 | 1530 | 1.4 | 1530 | 1.4 | 5.1 | 2.8 | 1.82 | 9.6 | 60 | 3 | 20 | 6 | 1.60 | 0.50 | yes | poor | Comparative Example |

Nugget diameter: $5\sqrt{t}$ or greater is excellent, $4\sqrt{t}$ or greater to less than $5\sqrt{t}$ is good, and less than $4\sqrt{t}$ is poor, where t is sheet thickness Table 1 shows that when performing resistance spot welding according to this disclosure, as compared to the Comparative Examples, splashing does not occur, and a nugget of an appropriate diameter can be formed.

Example 2

Resistance spot welding was performed similarly as in Example 1 to produce a resistance spot weld joint.

However, the current at this time had the current waveform illustrated in FIG. 4 or FIG. 5 (the initial current being performed in two or four steps) and was performed under the conditions listed in Tables 2-1 and 2-2. The electrode force was 4.5 kN, and the welding time of the main current was 10 to 14 cycles (200 ms to 280 ms). An insulating body was inserted between the steel sheets to adjust the distance between the electrodes to a predetermined distance.

The same electrodes as in Example 1 were used. The steel sheets were a combination of three overlapping sheets: one mild steel sheet having a galvannealing layer, and two high strength steel sheets having a hot-dip galvanizing layer.

Table 2-2 illustrates the results of verifying whether splashing occurred and verifying the nugget diameter upon performing welding. A nugget diameter of $5\sqrt{t}$ or greater was evaluated as excellent, $4\sqrt{t}$ or greater to less than $5\sqrt{t}$ as good, and less than $4\sqrt{t}$ as poor, where t is the sheet thickness. A diameter of $4\sqrt{t}$ or greater is an appropriate diameter.

Table 2 shows that when performing resistance spot welding according to this disclosure, as compared to the Comparative Examples, splashing does not occur, and a nugget of an appropriate diameter can be formed.

Furthermore, as compared to Example 1, in which two-step initial current was only performed once, Example 2 is superior in that depending on the conditions, a large nugget diameter could be obtained even when the current value in the final main current was low.

Example 3

Resistance spot welding was performed similarly as in Example 1 to produce a resistance spot weld joint.

However, the current at this time had the current waveform illustrated in FIG. 4 or FIG. 5 (the initial current being performed in two, four, or six steps) and was performed under the conditions listed in Tables 3-1 and 3-2. The electrode force was 5.5 kN, and the welding time $T_m$ of the main current was 10 to 18 cycles (200 ms to 360 ms). An insulating body was inserted between the steel sheets to adjust the distance between the electrodes to a predetermined distance.

The same electrodes and steel sheets as in Example 1 were used.

Table 3-2 illustrates the results of verifying whether splashing occurred and verifying the nugget diameter upon performing welding. A nugget diameter of $5\sqrt{t}$ or greater was evaluated as excellent, $4\sqrt{t}$ or greater to less than $5\sqrt{t}$ as

TABLE 2-1

| No. | Steel sheet 1 Tensile strength (MPa) | Steel sheet 1 Sheet thickness (mm) | Steel sheet 2 Tensile strength (MPa) | Steel sheet 2 Sheet thickness (mm) | Steel sheet 3 Tensile strength (MPa) | Steel sheet 3 Sheet thickness (mm) | L (mm) | t (mm) | L/t | $I_1$ (kA) | $T_1$ (ms) | $I_2$ (kA) | $T_2$ (ms) | $I_3$ (kA) | $T_3$ (ms) | $I_4$ (kA) | $T_4$ (ms) | Notes |
|---|---|---|---|---|---|---|---|---|---|---|---|---|---|---|---|---|---|---|
| 1 | 298 | 1 | 1210 | 1.6 | 1210 | 1.6 | 4.4 | 4.2 | 1.05 | 9.6 | 60 | 4 | 20 | 9 | 60 | 4 | 20 | Example |
| 2 | 298 | 1 | 1210 | 1.6 | 1210 | 1.6 | 4.4 | 4.2 | 1.05 | 9.6 | 60 | 3 | 20 | 9 | 60 | 3 | 20 | Example |
| 3 | 298 | 1 | 1210 | 1.6 | 1210 | 1.6 | 4.4 | 4.2 | 1.05 | 9.6 | 60 | 0 | 20 | 9 | 60 | 0 | 20 | Example |
| 4 | 298 | 1 | 1210 | 1.6 | 1210 | 1.6 | 4.4 | 4.2 | 1.05 | 9.6 | 60 | 0 | 20 | — | — | — | — | Example |
| 5 | 298 | 1 | 1210 | 1.6 | 1210 | 1.6 | 4.4 | 4.2 | 1.05 | <u>6</u> | 60 | <u>5</u> | 20 | <u>6</u> | 60 | 5 | 20 | Comparative Example |
| 6 | 298 | 1 | 1210 | 1.6 | 1210 | 1.6 | 7.2 | 4.2 | <u>1.71</u> | 9.6 | 60 | 3 | 20 | 9 | 60 | 3 | 20 | Comparative Example |
| 7 | 298 | 1 | 1210 | 1.6 | 1210 | 1.6 | 4.1 | 4.2 | 0.98 | 8.4 | 60 | 0 | 20 | 8.4 | 60 | 0 | 20 | Example |
| 8 | 298 | 1 | 1210 | 1.6 | 1210 | 1.6 | 4.1 | 4.2 | 0.98 | 12 | 40 | 0 | 40 | 8.4 | 60 | 0 | 20 | Example |
| 9 | 298 | 1 | 1210 | 1.6 | 1210 | 1.6 | 4.1 | 4.2 | 0.98 | 8.4 | 60 | 0 | 20 | — | — | — | — | Example |
| 10 | 298 | 1 | 1210 | 1.6 | 1210 | 1.6 | 4.1 | 4.2 | 0.98 | <u>6</u> | 60 | 0 | 20 | — | — | — | — | Comparative Example |

TABLE 2-2

| No. | $I_m$ (kA) | $T_m$ (ms) | Total welding time (ms) | $I_1/I_m$ | $I_2/I_m$ | $I_3/I_m$ | $I_4/I_m$ | Occurrence of splashing | Nugget diameter (between steel sheets 2-3) | Notes |
|---|---|---|---|---|---|---|---|---|---|---|
| 1 | 6.5 | 200 | 360 | 1.48 | 0.62 | 1.38 | 0.62 | no | excellent | Example |
| 2 | 6.5 | 200 | 360 | 1.48 | 0.46 | 1.38 | 0.46 | no | excellent | Example |
| 3 | 6.5 | 200 | 360 | 1.48 | 0.00 | 1.38 | 0.00 | no | good | Example |
| 4 | 6.5 | 280 | 360 | 1.48 | 0.00 | — | — | no | good | Example |
| 5 | 6.5 | 200 | 360 | <u>0.92</u> | 0.77 | <u>0.92</u> | 0.77 | yes | poor | Comparative Example |
| 6 | 6.5 | 200 | 360 | 1.48 | 0.46 | 1.38 | 0.46 | yes | poor | Comparative Example |
| 7 | 7 | 200 | 360 | 1.20 | 0.00 | 1.20 | 0.00 | no | excellent | Example |
| 8 | 7 | 200 | 360 | 1.71 | 0.00 | 1.20 | 0.00 | no | excellent | Example |
| 9 | 7 | 280 | 360 | 1.20 | 0.00 | — | — | no | good | Example |
| 10 | 7 | 280 | 360 | <u>0.86</u> | 0.00 | — | — | yes | poor | Comparative Example |

Nugget diameter: $5\sqrt{t}$ or greater is excellent, $4\sqrt{t}$ or greater to less than $5\sqrt{t}$ is good, and less than $4\sqrt{t}$ is poor, where t is sheet thickness good, and less than 4√t as poor, where t is the sheet thickness. In particular, a diameter of 5.5√ greater was evaluated as "excellent>5.5". A diameter of 4√t or greater is an appropriate diameter.

TABLE 3-1

| | Steel sheet 1 | | Steel sheet 2 | | | | | | | | |
|---|---|---|---|---|---|---|---|---|---|---|---|
| No. | Tensile strength (MPa) | Sheet thickness (mm) | Tensile strength (MPa) | Sheet thickness (mm) | L (mm) | t (mm) | L/t | $I_1$ (kA) | $T_1$ (ms) | $I_2$ (kA) | $T_2$ (ms) |
| 1 | 1210 | 1.6 | 1210 | 1.6 | 3.3 | 3.2 | 1.03 | 9 | 60 | 0 | 20 |
| 2 | 1210 | 1.6 | 1210 | 1.6 | 3.3 | 3.2 | 1.03 | 11 | 40 | 0 | 20 |
| 3 | 1210 | 1.6 | 1210 | 1.6 | 3.3 | 3.2 | 1.03 | 9 | 60 | 0 | 20 |
| 4 | 1210 | 1.6 | 1210 | 1.6 | 3.3 | 3.2 | 1.03 | 9 | 60 | 0 | 20 |
| 5 | 1210 | 1.6 | 1210 | 1.6 | 3.3 | 3.2 | 1.03 | <u>7</u> | 60 | 0 | 20 |
| 6 | 1210 | 1.6 | 1210 | 1.6 | 7 | 3.2 | <u>2.19</u> | 9 | 60 | 0 | 20 |
| 7 | 1210 | 1.6 | 1210 | 1.6 | 3.14 | 3.2 | 0.98 | 9.5 | 60 | 0 | 20 |
| 8 | 1210 | 1.6 | 1210 | 1.6 | 3.14 | 3.2 | 0.98 | 8.8 | 100 | 0 | 20 |
| 9 | 1210 | 1.6 | 1210 | 1.6 | 3.14 | 3.2 | 0.98 | 11.5 | 40 | 0 | 20 |
| 10 | 1210 | 1.6 | 1210 | 1.6 | 3.14 | 3.2 | 0.98 | 9.5 | 60 | 0 | 20 |
| 11 | 1210 | 1.6 | 1210 | 1.6 | 3.14 | 3.2 | 0.98 | 9.5 | 60 | 0 | 20 |
| 12 | 1210 | 1.6 | 1210 | 1.6 | 3.14 | 3.2 | 0.98 | <u>7.5</u> | 60 | 0 | 20 |
| 13 | 1004 | 1.2 | 1004 | 1.2 | 2.3 | 2.4 | 0.96 | 10.5 | 60 | 0 | 20 |
| 14 | 1004 | 1.2 | 1004 | 1.2 | 2.3 | 2.4 | 0.96 | 10.5 | 60 | 0 | 20 |
| 15 | 1004 | 1.2 | 1004 | 1.2 | 2.3 | 2.4 | 0.96 | 10.5 | 60 | 0 | 20 |
| 16 | 1004 | 1.2 | 1004 | 1.2 | 2.3 | 2.4 | 0.96 | <u>8</u> | 60 | 0 | 20 |
| 17 | 1032 | 2 | 1032 | 2 | 4 | 4 | 1.00 | 9.6 | 60 | 0 | 20 |
| 18 | 1032 | 2 | 1032 | 2 | 4 | 4 | 1.00 | 9.6 | 60 | 0 | 20 |
| 19 | 1032 | 2 | 1032 | 2 | 4 | 4 | 1.00 | 9.6 | 60 | 0 | 20 |
| 20 | 1032 | 2 | 1032 | 2 | 4 | 4 | 1.00 | <u>7</u> | 60 | 0 | 20 |
| 21 | 1502 | 1.6 | 1502 | 1.6 | 3.18 | 3.2 | 0.99 | 9 | 60 | 0 | 20 |
| 22 | 1502 | 1.6 | 1502 | 1.6 | 3.18 | 3.2 | 0.99 | 9 | 60 | 0 | 20 |
| 23 | 1502 | 1.6 | 1502 | 1.6 | 3.18 | 3.2 | 0.99 | 9 | 60 | 0 | 20 |
| 24 | 1502 | 1.6 | 1502 | 1.6 | 3.18 | 3.2 | 0.99 | <u>7</u> | 60 | 0 | 20 |

| No. | $I_3$ (kA) | $T_3$ (ms) | $I_4$ (kA) | $T_4$ (ms) | $I_5$ (kA) | $T_5$ (ms) | $I_6$ (kA) | $T_6$ (ms) | Notes |
|---|---|---|---|---|---|---|---|---|---|
| 1 | 8.5 | 60 | 0 | 20 | 8.5 | 60 | 0 | 20 | Example |
| 2 | 8.5 | 60 | 0 | 20 | 8.5 | 60 | 0 | 20 | Example |
| 3 | 8.5 | 60 | 0 | 20 | — | — | — | — | Example |
| 4 | — | — | — | — | — | — | — | — | Example |
| 5 | <u>7</u> | 60 | 0 | 20 | <u>7</u> | 60 | 0 | 20 | Comparative Example |
| 6 | 8.5 | 60 | 0 | 20 | 8.5 | 60 | 0 | 20 | Comparative Example |
| 7 | 9 | 60 | 0 | 20 | 9 | 60 | 0 | 20 | Example |
| 8 | 8.4 | 60 | 0 | 20 | 8.4 | 60 | 0 | 20 | Example |
| 9 | 9 | 60 | 0 | 20 | 9 | 60 | 0 | 20 | Example |
| 10 | 9 | 60 | 0 | 20 | — | — | — | — | Example |
| 11 | — | — | — | — | — | — | — | — | Example |
| 12 | <u>7.5</u> | 60 | 0 | 20 | <u>7.5</u> | 60 | 0 | 20 | Comparative Example |
| 13 | 9 | 60 | 0 | 20 | 9 | 60 | 0 | 20 | Example |
| 14 | 9 | 60 | 0 | 20 | — | — | — | — | Example |
| 15 | — | — | — | — | — | — | — | — | Example |
| 16 | <u>8</u> | 60 | 0 | 20 | <u>8</u> | 60 | 0 | 20 | Comparative Example |
| 17 | 8.6 | 60 | 0 | 20 | 8.6 | 60 | 0 | 20 | Example |
| 18 | 8.6 | 60 | 0 | 20 | — | — | — | — | Example |
| 19 | — | — | — | — | — | — | — | — | Example |
| 20 | <u>7</u> | 60 | 0 | 20 | <u>7</u> | 60 | 0 | 20 | Comparative Example |
| 21 | 8.5 | 60 | 0 | 20 | 8.5 | 60 | 0 | 20 | Example |
| 22 | 8.5 | 60 | 0 | 20 | — | — | — | — | Example |
| 23 | — | — | — | — | — | — | — | — | Example |
| 24 | <u>7</u> | 60 | 0 | 20 | <u>7</u> | 60 | 0 | 20 | Comparative Example |

TABLE 3-2

| No. | $I_m$ (kA) | $T_m$ (ms) | Total welding time (ms) | $I_1/I_m$ | $I_2/I_m$ | $I_3/I_m$ | $I_4/I_m$ | $I_5/I_m$ | $I_6/I_m$ | Occurrence of splashing | Nugget diameter | Notes |
|---|---|---|---|---|---|---|---|---|---|---|---|---|
| 1 | 8 | 200 | 440 | 1.13 | 0.00 | 1.06 | 0.00 | 1.06 | 0.00 | no | excellent >5.5 | Example |
| 2 | 8 | 200 | 420 | 1.38 | 0.00 | 1.06 | 0.00 | 1.06 | 0.00 | no | excellent >5.5 | Example |
| 3 | 8 | 280 | 440 | 1.13 | 0.00 | 1.06 | 0.00 | — | — | no | excellent | Example |
| 4 | 8 | 360 | 440 | 1.13 | 0.00 | — | — | — | — | no | excellent | Example |
| 5 | 8 | 200 | 440 | <u>0.88</u> | 0.00 | <u>0.88</u> | 0.00 | <u>0.88</u> | 0.00 | yes | poor | Comparative Example |
| 6 | 8 | 200 | 440 | 1.13 | 0.00 | 1.06 | 0.00 | 1.06 | 0.00 | yes | poor | Comparative Example |
| 7 | 8.5 | 200 | 440 | 1.12 | 0.00 | 1.06 | 0.00 | 1.06 | 0.00 | no | excellent >5.5 | Example |
| 8 | 8 | 200 | 480 | 1.10 | 0.00 | 1.05 | 0.00 | 1.05 | 0.00 | no | excellent >5.5 | Example |

TABLE 3-2-continued

| No. | $I_m$ (kA) | $T_m$ (ms) | Total welding time (ms) | $I_1/I_m$ | $I_2/I_m$ | $I_3/I_m$ | $I_4/I_m$ | $I_5/I_m$ | $I_6/I_m$ | Occurrence of splashing | Nugget diameter | Notes |
|---|---|---|---|---|---|---|---|---|---|---|---|---|
| 9 | 8.5 | 200 | 420 | 1.35 | 0.00 | 1.06 | 0.00 | 1.06 | 0.00 | no | excellent >5.5 | Example |
| 10 | 8.5 | 280 | 440 | 1.12 | 0.00 | 1.06 | 0.00 | — | — | no | excellent | Example |
| 11 | 8.5 | 360 | 440 | 1.12 | 0.00 | — | — | — | — | no | excellent | Example |
| 12 | 8.5 | 200 | 440 | 0.88 | 0.00 | 0.88 | 0.00 | 0.88 | 0.00 | yes | poor | Comparative Example |
| 13 | 8.5 | 200 | 440 | 1.24 | 0.00 | 1.06 | 0.00 | 1.06 | 0.00 | no | excellent >5.5 | Example |
| 14 | 8.5 | 280 | 440 | 1.24 | 0.00 | 1.06 | 0.00 | — | — | no | excellent | Example |
| 15 | 8.5 | 360 | 440 | 1.24 | 0.00 | — | — | — | — | no | excellent | Example |
| 16 | 8.5 | 200 | 440 | 0.94 | 0.00 | 0.94 | 0.00 | 0.94 | 0.00 | yes | poor | Comparative Example |
| 17 | 8 | 240 | 480 | 1.20 | 0.00 | 1.08 | 0.00 | 1.08 | 0.00 | no | excellent >5.5 | Example |
| 18 | 8 | 280 | 440 | 1.20 | 0.00 | 1.08 | 0.00 | — | — | no | excellent | Example |
| 19 | 8 | 320 | 400 | 1.20 | 0.00 | — | — | — | — | no | excellent | Example |
| 20 | 8 | 240 | 480 | 0.88 | 0.00 | 0.88 | 0.00 | 0.88 | 0.00 | yes | poor | Comparative Example |
| 21 | 8 | 240 | 480 | 1.13 | 0.00 | 1.06 | 0.00 | 1.06 | 0.00 | no | excellent >5.5 | Example |
| 22 | 8 | 300 | 460 | 1.13 | 0.00 | 1.06 | 0.00 | — | — | no | excellent | Example |
| 23 | 8 | 360 | 440 | 1.13 | 0.00 | — | — | — | — | no | excellent | Example |
| 24 | 8 | 240 | 480 | 0.88 | 0.00 | 0.88 | 0.00 | 0.88 | 0.00 | yes | poor | Comparative Example |

Nugget diameter: 5.5√t or greater is excellent >5.5, 5√t or greater is excellent, 4√t or greater to less than 5√t is good, and less than 4√t is poor, where t is sheet thickness Table 3-2 shows that when performing resistance spot welding according to this disclosure, as compared to the Comparative Examples, splashing does not occur, and a nugget of an appropriate diameter can be formed.

Furthermore, as compared to Examples 1 and 2, in which two-step initial current was only performed once or twice, a superior effect was obtained in that the nugget diameter was increased.

REFERENCE SIGNS LIST 1, 2 Steel sheet
3 Sheet combination
4, 5 Electrode
6 Nugget
7 Insulating body

The invention claimed is:

1. A method of resistance spot welding to join a sheet combination by squeezing the sheet combination between a pair of electrodes and passing current while applying electrode force, the sheet combination being a plurality of overlapping steel sheets including at least one galvanized steel sheet or high tensile strength steel sheet, the galvanized steel sheet having, on a surface thereof, a coated layer with zinc as a main component, the method comprising:
(1) starting to apply electric current to the sheet combination when the sheet combination satisfies:

$0.9 \times t \leq L \leq 1.1 \times t$ where t is a total thickness of the overlapping steel sheets and L is a distance between tips of the pair of electrodes; and (2) dividing the electric current a into main current period and an initial current period such that the initial current period precedes the main current period and the initial current period is a two-step current, setting a current value $I_1$ in a first step of the initial current period to satisfy:

$I_m \times 1.1 \leq I_1 \leq 15.0$ kA where $I_m$ is a current value during the main current period, and setting a current value $I_2$ in a second step of the initial current period to satisfy:

$0 \leq I_2 \leq I_m \times 0.7$ setting welding times in the first step and the second step of the initial current period to satisfy:

10 ms $\leq T_1 \leq$ 100 ms 10 ms $\leq T_2 \leq$ 100 ms where $T_1$ is a welding time in the first step of the initial current period, and $T_2$ is a welding time or a non-welding time in the second step of the initial current period.

2. The method of claim 1, wherein the initial current period is 2k-step current (where k is an integer greater than or equal to 2).

3. The method of claim 2, wherein when performing the initial current period that is 2k-step current (where k is an integer greater than or equal to 2), a current value $I_{(2n+1)}$ in a $(2n+1)^{th}$ step (where n is an integer from 1 to k−1) of the initial current period satisfies:

$I_m \leq I_{(2n+1)} \leq I_{(2n-1)}$ with respect to a current value $I_{(2n-1)}$ in a $(2n-1)^{th}$ step and the current value $I_m$ during the main current period.

4. The method of claim 1, wherein among the plurality of steel sheets, at least one sheet is a high tensile strength galvanized steel sheet with a tensile strength of 780 MPa or more.

5. The method of claim 2, wherein among the plurality of steel sheets, at least one sheet is a high tensile strength galvanized steel sheet with a tensile strength of 780 MPa or more.

6. The method of claim 3, wherein among the plurality of steel sheets, at least one sheet is a high tensile strength galvanized steel sheet with a tensile strength of 780 MPa or more.

* * * * *